United States Patent [19]
Miller et al.

[11] Patent Number: 5,549,720
[45] Date of Patent: Aug. 27, 1996

[54] FILTER

[75] Inventors: Gregory R. Miller, Chesterfield; Kyle Adriance; Stanley Philipak, both of St. Charles, all of Mo.

[73] Assignee: Nellcor Puritan-Bennett Incorporated, St. Charles, Mo.

[21] Appl. No.: 359,024

[22] Filed: Dec. 19, 1994

[51] Int. Cl.$^6$ .................................................. B01D 46/00
[52] U.S. Cl. .............................. 55/324; 55/484; 96/134
[58] Field of Search .......................... 55/324, 476, 484; 95/130; 96/134, 136

[56] References Cited

U.S. PATENT DOCUMENTS

| | | | |
|---|---|---|---|
| 533,854 | 2/1895 | Loeb | 55/484 |
| 1,499,864 | 7/1924 | Gordon | 55/484 |
| 1,573,656 | 2/1926 | Terhune | 55/484 |
| 2,338,345 | 1/1944 | Mather | 55/484 |
| 2,552,847 | 5/1951 | Farr et al. | 55/484 |
| 4,277,443 | 7/1981 | Van Der Smissen et al. | 55/484 |
| 4,637,877 | 1/1987 | Hartmann et al. | 55/484 |
| 4,881,313 | 11/1989 | Artinyan et al. | 55/487 |
| 4,995,891 | 2/1991 | Jaynes | 55/484 |
| 5,037,460 | 8/1991 | Machado | 55/484 |

FOREIGN PATENT DOCUMENTS

| | | | |
|---|---|---|---|
| 433437 | 8/1925 | Germany | 55/484 |
| 374460 | 2/1964 | Switzerland | 55/484 |
| 365478 | 1/1932 | United Kingdom | 55/484 |

Primary Examiner—C. Scott Bushey
Attorney, Agent, or Firm—Paul M. Denk

[57] ABSTRACT

A pre-filter for an oxygen concentrator having enhanced filtering area. The pre-filter is positioned so that air entering the concentrator's air compressor is filtered to removed particulate contaminants. The pre-filter has an impermeable housing consisting of four walls in a rectangular configuration. There is, within the housing, a first filter pledget of porous filter material and second filter pledget of porous filter material with an air space in-between the pledgets. Each pledget has an exposed filtering surface and a material thickness of porous filter material. The opening of a conduit tube that is in fluid communication with the air compressor is positioned in the air space between the filter pledgets. Air entering the conduit tube passes through one of the exposed filtering surfaces and one material thickness of porous filter material.

8 Claims, 4 Drawing Sheets

FILTER

BACKGROUND OF THE INVENTION

Oxygen concentrators often are used in place of oxygen canisters or liquefied oxygen to provide oxygen therapy to a patient. Oxygen concentrators function by eliminating nitrogen from room air. Oxygen concentrators include sieves containing nitrogen-absorbing materials such as zeolite. Room air is drawn into the concentrator, compressed and forced through the sieve. The nitrogen is absorbed out of the air resulting in concentrated oxygen flowing out to the patient. A large volume of air is required for an oxygen concentrator to produce an appropriate amount of concentrated oxygen. Filtering out dust and other foreign particles is essential to keeping a concentrator operating at optimum levels. Generally, the concentrator has an opening in the cabinet for the inflow of air into the device. There is an intake filter across that opening to remove large gross contaminants. This filter is easily removed and cleaned on a daily basis. There is a second filter or inlet pre-filter positioned at the inlet into the air compressor. Heretofore, the inlet pre-filters have had minimal filtering surface that restrict flow into the compressor. It takes approximately seventy (70) liters per minute of air to deliver five (5) liters per minute of highly concentrated oxygen. If an inadequate filtering system is used, the volume of air to the sieve beds will be restricted. This can result in sieve failure and reduced performance.

SUMMARY OF THE INVENTION

It is therefore, among the principal objects of the present invention to provide an improved inlet pre-filter to filter the room air entering an oxygen concentrator compressor.

It is another object of the invention to provide such a filter having a dual filtering surface to increase the effective surface area of the filter.

Another object of the invention is to provide such a filter having a dual filtering surface to improve the efficiency of the filter.

Still another object of the present invention is to provide a pre-filter in which the opening of the conduit leading to the air compressor is positioned between two material thicknesses of porous filter material so that the air has to pass through at least one material thickness of porous filer material before entering the conduit.

Yet another object of the present invention is to provide such a filter that is disposable and can be removed and replaced with a clean filter to improve efficiency.

Still another object of the present invention is to provide such a filter that can be easily installed or replaced in an oxygen concentrator.

Generally stated, a pre-filter for an oxygen concentrator disposed to filter air entering the concentrator compressor is provided having dual filters to increase the filtering surface area and to increase the efficiency of the filter. The pre-filter has a first filter pledget having a material thickness of porous filter material and a second filter pledget having a material thickness of porous filter material with air spaces in-between the filter pledgets. The filter pledgets are surrounded by an impermeable housing wall leaving only the filtering surfaces exposed. The opening of the air conduit leading from the pre-filter to the concentrator compressor is located between the material thicknesses of porous filter material so only air that passes through one of the material thickness of porous filter material and penetrates to the air space between the material thicknesses of filter material can enter the air compressor. The surfaces, as well as the material thicknesses of the porous filter material, entrap pollutants and prevent them from entering the concentrator compressor and sieves.

DESCRIPTION OF THE PREFERRED EMBODIMENT

Figure 1:
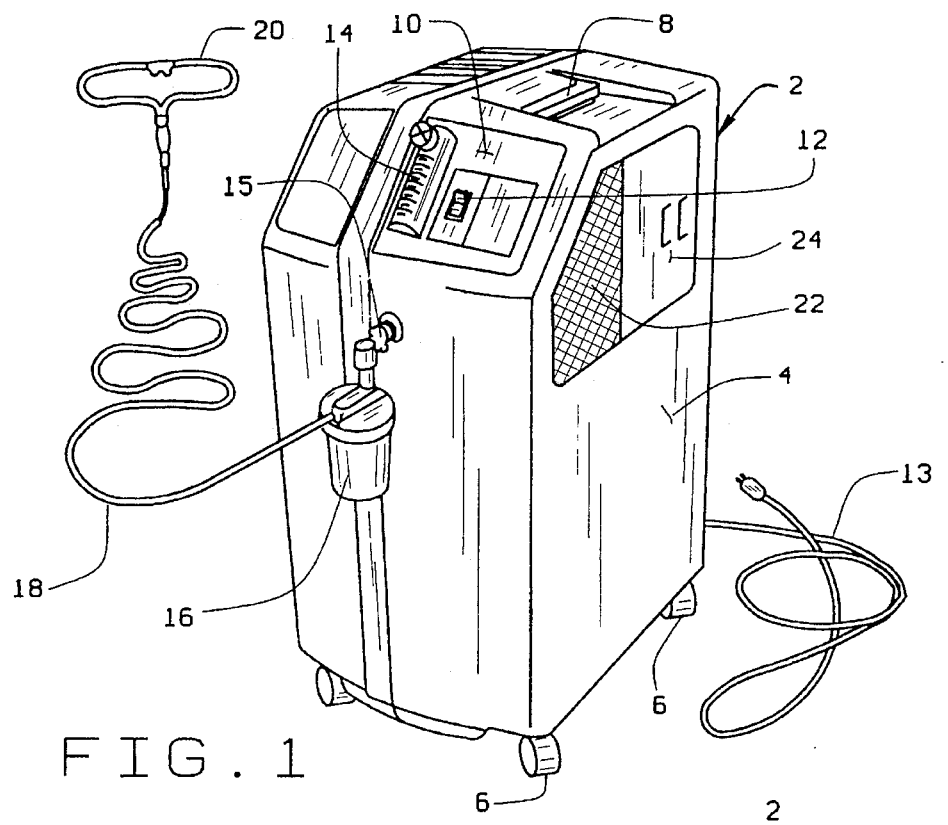
FIG. 1 is an isometric view of an oxygen concentrator employing the pre-filter of the present invention.
Figure 2:
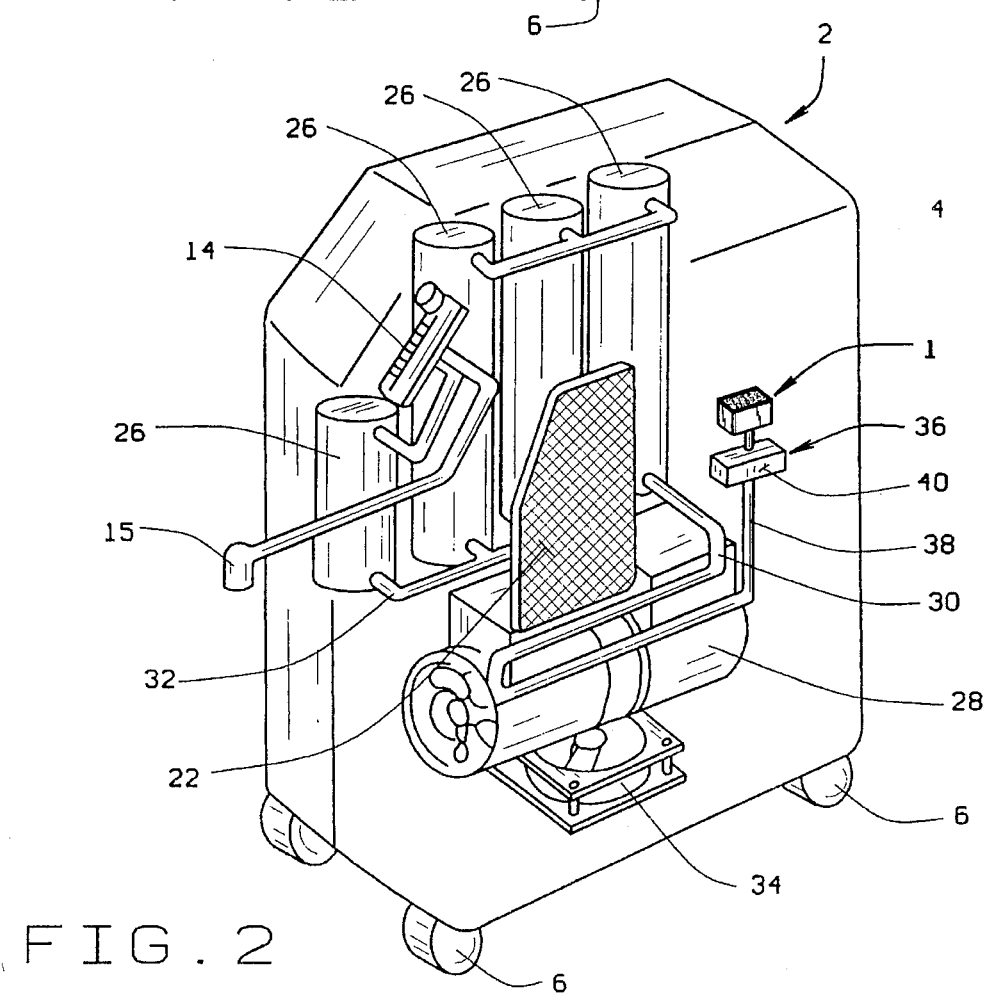
FIG. 2 is a perspective view of the internal elements of the oxygen concentrator.

The pre-filter of the present invention for an oxygen concentrator generally is indicated in the drawings by reference numeral 1. The pre-filter 1 is installed in an oxygen concentrator indicated generally by reference numeral 2. As best shown in FIGS. 1 and 2, the oxygen concentrator 2 has a housing or cabinet 4. Cabinet 4 is a conventional mobile housing having casters 6 on the four bottom comers and a carrying handle 8 on top. Cabinet 4 has a control panel 10 with a power switch 12 to control the function of the internal components as well as a conventional power cord 13. There is a flowmeter 14 mounted adjacent the control panel 10. An oxygen connection 15 extends through the front side of the cabinet. An optional humidifier 16 is attached to the connection 15. One end of a conventional oxygen tubing 18 is connected to the humidifier 16. The tubing 18 can be attached directly to connection 14. An oxygen cannula 20 is attached to the opposite end of the oxygen tubing 18. There is an intake filter 22 in one side panel and an small access door 24 in the same panel, adjacent the intake filter.

FIG. 2 illustrates the essential internal elements of concentrator 2. The concentrator 2 has a plurality of sieve canisters 26. The sieves 26 contain a nitrogen absorbing material such as zeolite. The sieves 26 are connected, on the inlet side, to a conventional air compressor 28 by tubing or conduit 30. The outlet side of the sieves 26 is connected to the oxygen connection 14 by tubing or conduit 32. There is an exhaust fan 34 in the bottom of the cabinet 4. The air compressor 28 is connected to a pre-filtering assembly, indicated generally by reference numeral 36, by a tubing or conduit 38. Pre-filtering assembly 36 has, in tandem, a bacteria filter 40 connected to the conduit 38 and the pre-filter 1 of the present invention connected to the bacteria filter 40. In use, the exhaust fan 34 draws air into cabinet 4 through intake filter 22. The air enters the pre-filter 1 and passes through the bacteria filter 40 and into the air compressor 28 where it is compressed and forced into sieves 26. In sieves 26 the nitrogen is absorbed by the zeolite and then passed through flowmeter 12, connection 15, humidifier 16, tubing 18 and cannula 20 to a patient. The pre-filter 1 of the present invention will be described in greater detail after a description of a prior art pre-filter.

Figure 3:
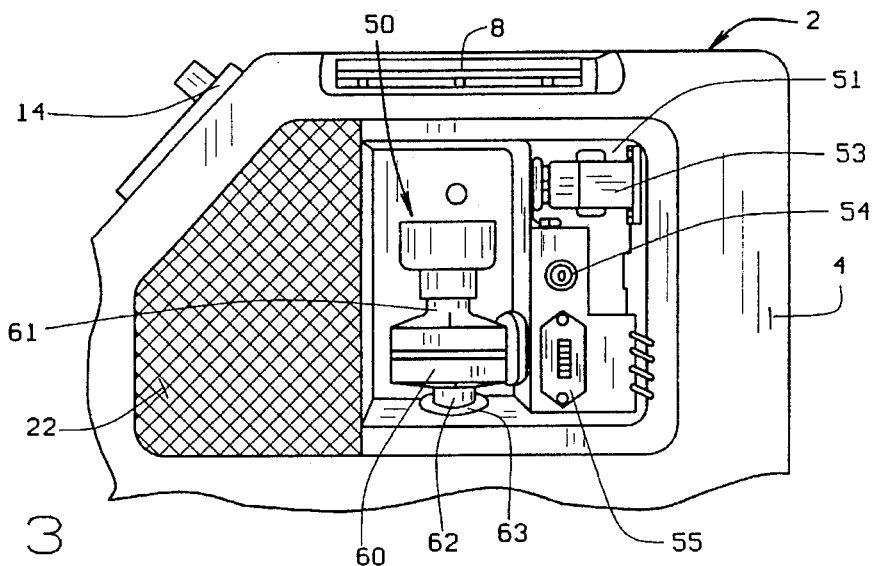
FIG. 3 is a front elevational view of a prior an pre-filter installed in an oxygen concentrator.
Figure 4:
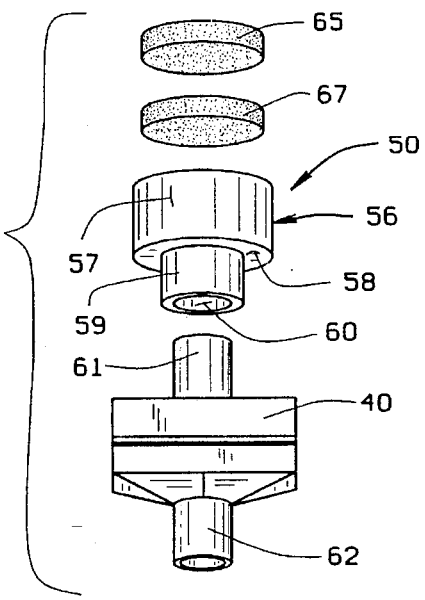
FIG. 4 is an exploded view of the prior art pre-filter.

A prior art pre-filter, indicated generally by reference numeral 50, is shown in greater detail in FIGS. 3 and 4. Pre-filter 50 is situated in side compartment 51 in cabinet 4 immediately inside the access door 24. As will be appreciated, side compartment 51 is adjacent intake filter 22. Also housed inside compartment 51 are an alarm battery 53, a circuit breaker 54, and an hour meter 55. Pre-filter 50 is connected to a conventional bacteria filter 40. Pre-filter 50 has a housing 56. The housing is substantially circular in configuration having a circular side wall 57, which defines an interior chamber (not shown) and a bottom wall 58. Bottom wall 58 has a concentric collar 59 that has a bore 60 dimensioned to fit over the neck 61 extending upward from the bacteria filter 40 to form an air tight connection between pre-filter 50 and the bacteria filter 40. Bacteria filter 40 has a second neck 62 that connects to an opening 63 which is in fluid communication with the conduit 38 leading to the air compressor 28 forming an air tight conduit from the pre-filter to the air compressor. There are two disposable filters 65 and 67 in housing 56. Each filter is formed in a disc shape from a porous filter material such as selected from a material or synthetic composition, such as wool, felt, or polymers like rayon or the like. The two filters are dimensioned to fit inside housing 56 and substantially fill the chamber therein. Filter 65 is stacked on top of filter 67. It will be appreciated that the pre-filter 50 is closed to air except for the exposed surface of top filter 65. The filtering assembly is air-tight except for the filters. Therefore, air that enters the pre-filter 50 only can enter by passing through the exposed surface of filter 65. This is a substantially restricted area of entry and can affect performance of the concentrator 2.

Figure 5:
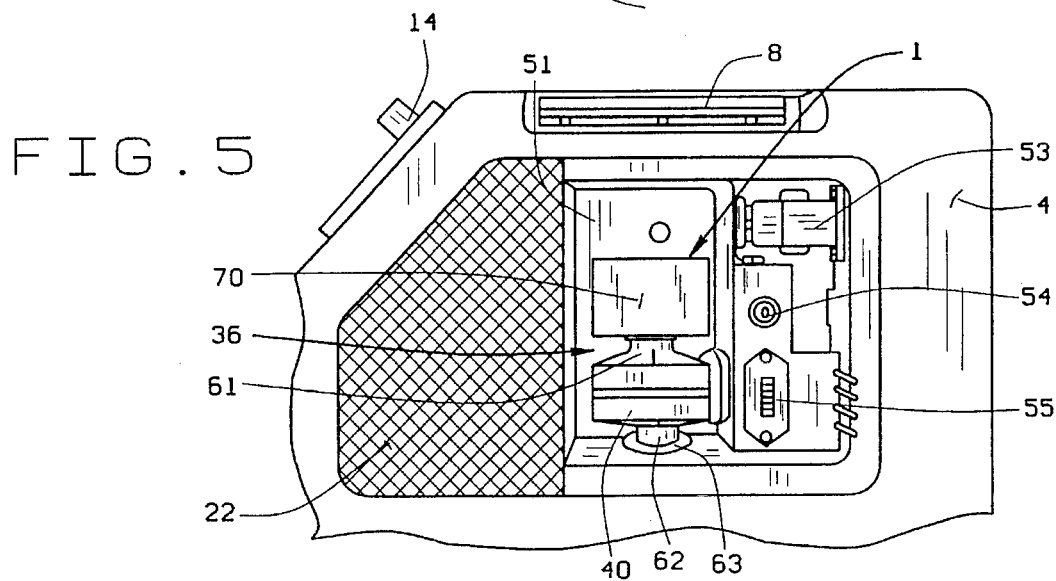
FIG. 5 is a side elevational view of a pre-filter of the present invention installed in an oxygen concentrator.
Figure 6:
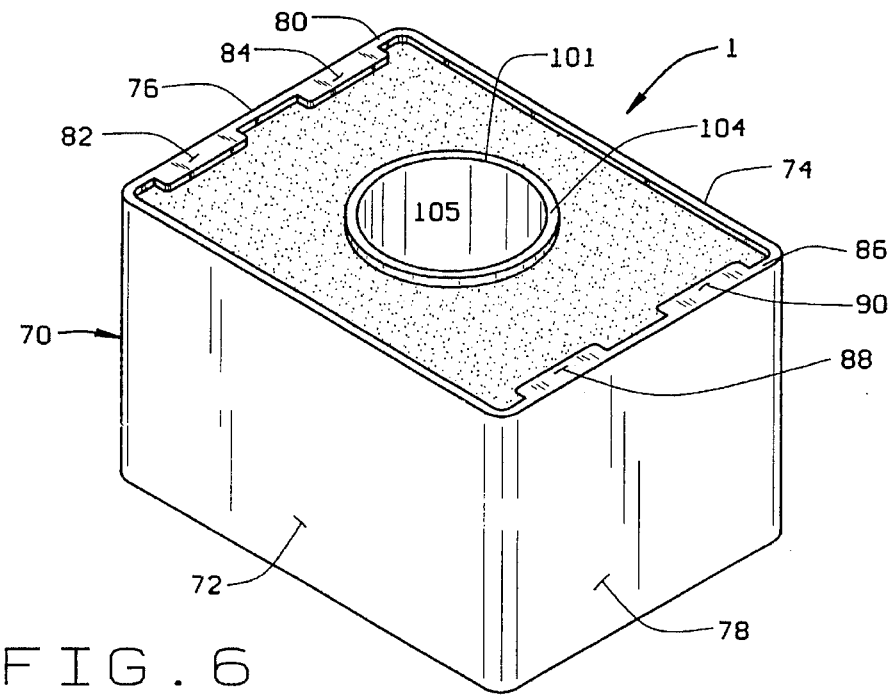
FIG. 6 is an isometric view of the pre-filter of the present invention, bottom side up.
Figure 7:
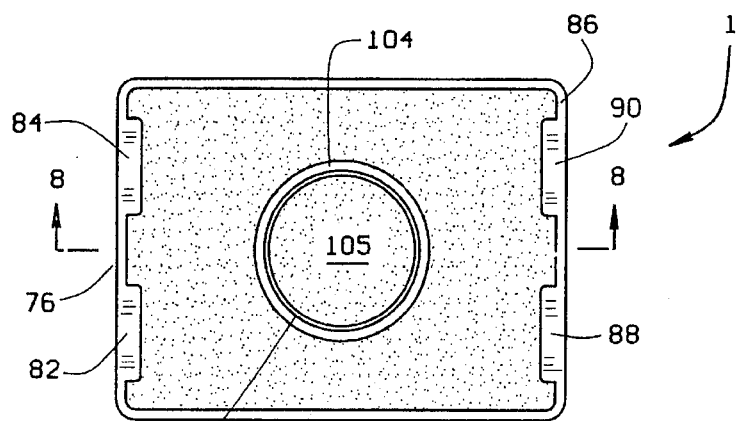
FIG. 7 is a bottom plan thereof.
Figure 8:
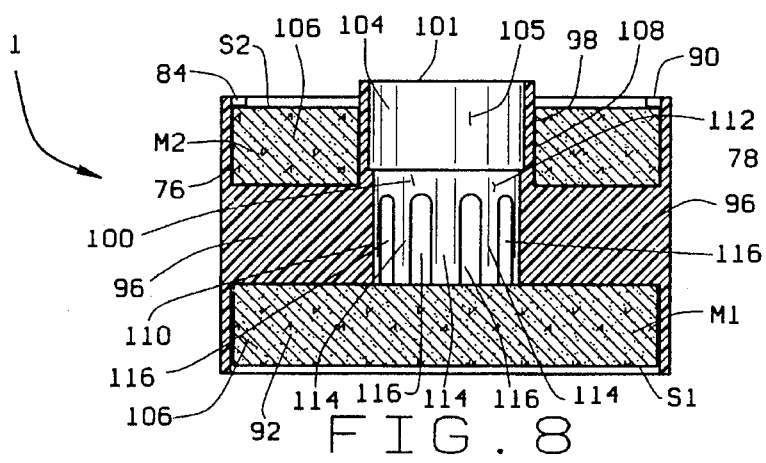
FIG. 8 is a cross sectional view take across lines 8—8 of FIG. 7.
Figure 9:
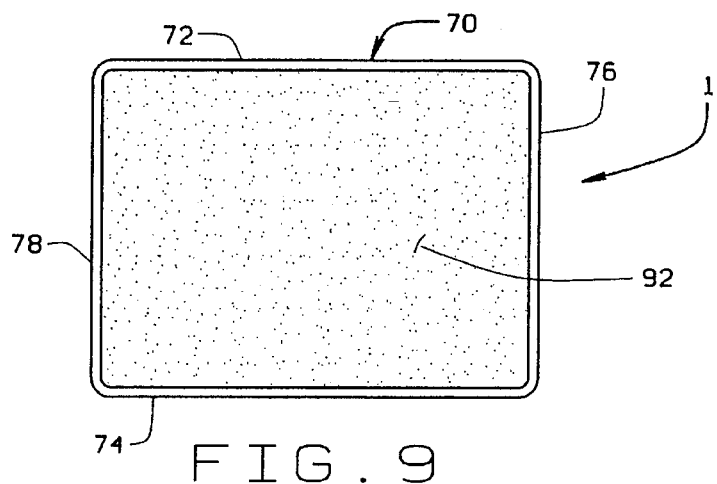
FIG. 9 is a top plan thereof.
Figure 10:
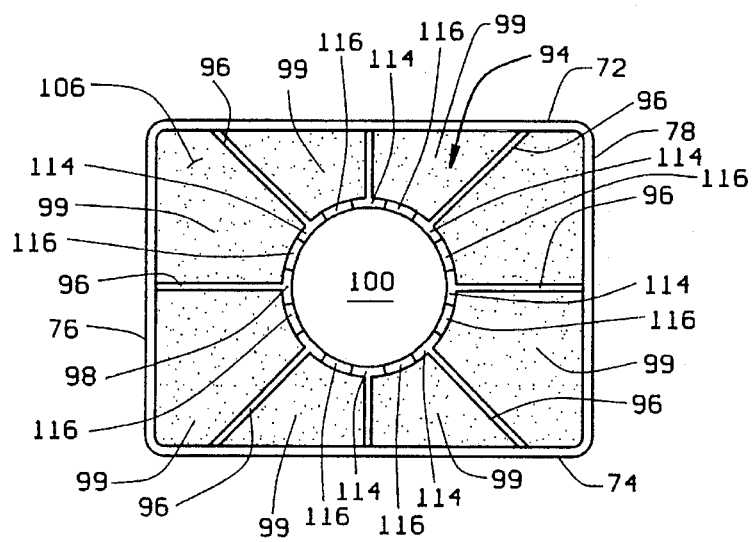
FIG. 10 is a top plan with the top pledget removed.
Figure 11:
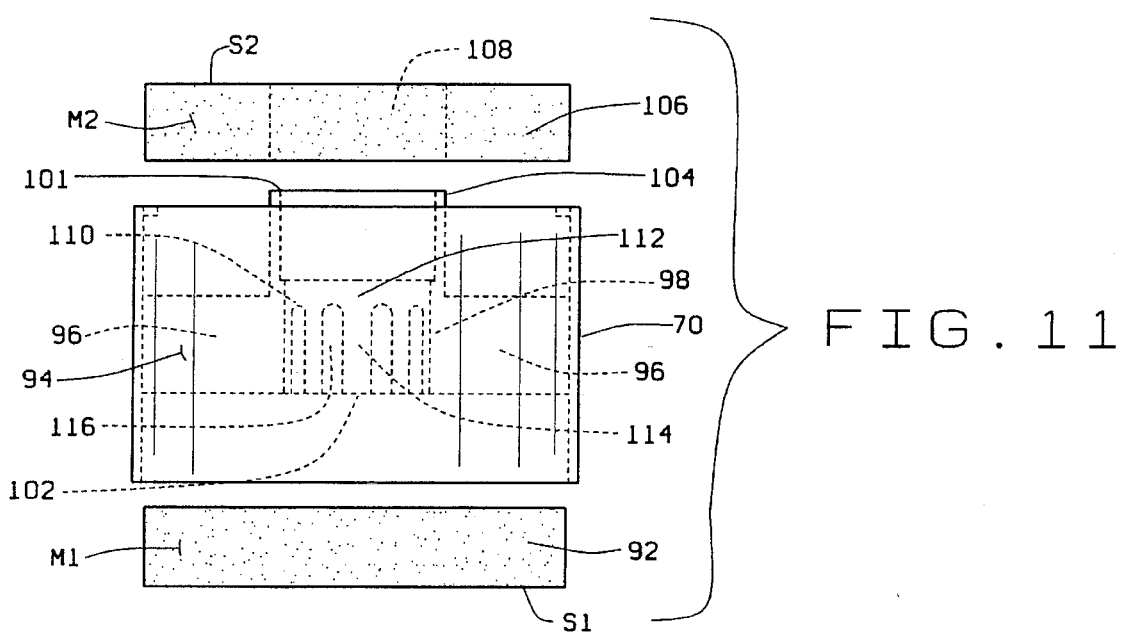
FIG. 11 is an exploded view of the pre-filter of the present invention.

The pre-filter 1 of the present invention is shown in greater detail in FIGS. 5–10. As shown in FIG. 5, pre-filter 1 is positioned within the concentrator 2 in a manner similar to that of the prior art pre-filter 50. Pre-filter 1 has a housing 70. Housing 70 is generally rectangular in shape having opposed parallel side walls 72 and 74 and opposed end walls 76 and 78. The bottom edge 80 of end wall 76 has a pair of tabs 82 and 84 and the bottom edge 86 of end wall 78 has a pair of tabs 88 and 90. A first pledget 92 is positioned in the upper half of homing 70. The pledget 92 is generally rectangular in shape having the same configuration as housing 70 and is configured to fit with in the respective walls. Pledget 92 has an exposed surface $S_1$ and a material thickness $M_1$ of porous filter material. Pledget 92 rests on a internal framework 94. The framework 94 consists of a plurality of struts 96 and a short tube or conduit 98. The struts 96 extend from the inside of housing 70 to the conduit 98. Conduit 98 is positioned centrally in housing 70 by the struts. There are a plurality of air spaces 99 between the struts. Conduit 98 has an axial bore 100. Conduit 98 has a first open end 101 and a second open end 102 in communication with bore 100. The first open end 101 has a collar 104 that extends slightly beyond the housing walls on the bottom side of the pre-filter. Collar 104 has an internal bore 105 dimensioned so that collar 104 can fit on neck 61 of bacterial filter 40 with a tight friction fit. A second pledget 106 having an opening 108 formed centrally therein, surrounds collar 104 and is held in place against framework 94 by the tabs 82, 84, 88 and 90. Second pledget 106 has an exposed filtering surface $S_2$ and a material thickness $M_2$ of porous filter material. The second open end 102 of conduit 98 consists of a tubular grate 110. Grate 110 consists of a ring 112 which is integrally attached to collar 104 and a plurality of fingers 114 extending from ring 112. There is a plurality of open spaces 116 between the fingers 114. There is one open space 116 positioned at, and in fluid communication with, each air space 99. The air spaces 99 and the open spaces 116 at the second end of the conduit are in communication with bore 100. When the pre-filter 1 is mounted on the bacterial filter 40, as shown in FIG. 5, the conduit 98 is in fluid communication with the conduit 38 that leads to the compressor 28. Air entering the compartment 51, after passing though filter 22, is drawn through the first pledget 92 or through the second pledget 106 and is filtered. It will be appreciated, therefore, that pre-filter 1 provides more filtering surface i.e. surfaces $S_1$ and $S_2$ than the prior art pre-filter 50. This configuration allows for greater air flow into the pre-filter 1 and allows the compressor 26 to operate at greater efficiency. Furthermore, since the spaces 116 between fingers 114 are positioned at the midpoint between the first pledget 92 and the second pledget 106, the air must pass half-way though the pre-filter 1, either from the top or the bottom or both, before it can enter the conduit 98 and, eventually, compressor 26. Thus the air passes through material thicknesses $M_1$ or $M_2$ prior to entering the bacterial filter 40 and eventually the compressor 26. The pledgets 92 and 106 can be removed and replaced with clean pledgets when needed. The housing, framework, and air tube are all preferably constructed of a dense and high grade plastic, that provides a high impact type plastic for formation of these components.

It will be appreciated by those skilled in the art that various modifications or changes may be made in the pre-filter of the present invention without departing from the scope of the appended claims. Therefore, the foregoing description and accompanying drawings are intended to be illustrative only and should not be viewed in a limiting sense.

What is claimed:

1. A pre-filter assembly for filtering air entering the compressor of an oxygen concentrator, comprising:

a housing;

a first filter pledget of porous filter material within said housing, said first filter pledget having a first exposed filtering surface and a first material thickness of porous filter material adjacent said surface;

a second filter pledget of porous filter material within said housing, said second filter pledget having a second exposed filtering surface and a second material thickness of porous filter material adjacent said surface;

a framework between said first and second filter pledgets, said framework defining a plurality of air spaces, and said framework formed integrally of said housing;

an air tube positioned centrally in said framework and extending from a first open end to a second open end, said first open end positioned approximately at the midpoint between said material thicknesses and said second open end being in fluid communication with the air compressor of the oxygen concentrator, said first open end formed having a plurality of integral fingers formed thereon, said fingers defining a plurality of open spaces between said fingers, one each of said plurality of open spaces being in fluid communication with one each of said plurality of air spaces, a plurality of integral radial struts extending from select of said fingers to the housing, and arranged between said first and second filter pledgets to form said plurality of air spaces in fluid communication with said open spaces between the said fingers, and said plurality of open spaces between the fingers being aligned with the length of the said air tube and remaining free of contact with the first and second filter pledgets;

said air tube disposed within said filter so that air passing through either said first filtering surface and said first material thickness or the second filtering surface and said second material thickness enters said air tube for transfer to the oxygen concentrator air compressor.

2. The pre-filter assembly of claim 1 and wherein the first exposed filtering surface of the first filter pledget opening upwardly of the filter housing, and the second exposed filtering surface of the second filter pledget opening downwardly of said filter housing.

3. The pre-filter of claim 2 wherein said plurality of fingers and the plurality of open spaces between said fingers form a grate configuration within said air space between said material thicknesses of porous filter material.

4. The pre-filter assembly claim 3 wherein said porous filter material is one of a natural or synthetic material.

5. The pre-filter assembly of claim 4 wherein said housing, said framework, and said air tube are constructed from high impact plastic.

6. The pre-filter assembly of claim 4 wherein the material is selected from the group consisting of wool and felt.

7. The pre-filter assembly of claim 5 wherein the material is polymer.

8. The pre-filter assembly of claim 7 wherein the material is polymer, said polymer selected from the group consisting of rayon and nylon.

\* \* \* \* \*